US012730639B2

(12) United States Patent
Randall et al.

(10) Patent No.: US 12,730,639 B2
(45) Date of Patent: Sep. 8, 2026

(54) INDEXED VECTOR PERMUTATION OPERATIONS

(71) Applicant: Arm Limited, Cambridge (GB)

(72) Inventors: Joshua Randall, Austin, TX (US); Siying Feng, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/329,456

(22) Filed: Jun. 5, 2023

(65) Prior Publication Data

US 2024/0403052 A1 Dec. 5, 2024

(51) Int. Cl.
*G06F 9/30* (2018.01)

(52) U.S. Cl.
CPC ...... *G06F 9/30145* (2013.01); *G06F 9/30032* (2013.01); *G06F 9/30036* (2013.01); *G06F 9/3012* (2013.01)

(58) Field of Classification Search
CPC ........................... G06F 9/3012; G06F 9/30032
See application file for complete search history.

(56) References Cited

U.S. PATENT DOCUMENTS 5,125,092 A 6/1992 Prener
6,904,510 B1 6/2005 Sijistemans
9,959,247 B1 * 5/2018 Woo .................... G06F 9/30032
2006/0061471 A1 3/2006 Macari
2006/0184765 A1 * 8/2006 Krueger .................... G06F 7/76 712/E9.034
2009/0100247 A1 * 4/2009 Moyer ................ G06F 9/30145 712/E9.024
2009/0249026 A1 10/2009 Smelyanskiy
2013/0212355 A1 8/2013 Mimar
2014/0052886 A1 2/2014 Freimuth
2014/0101358 A1 * 4/2014 Kaltenbach ........... H04L 49/101 710/317
2014/0281418 A1 9/2014 Kuo
2017/0090921 A1 3/2017 Hughes et al.
2017/0262282 A1 * 9/2017 Ould-Ahmed-Vall ....................... G06F 9/30109
2019/0042253 A1 * 2/2019 Eyole .................. G06F 9/30076
2019/0347104 A1 11/2019 Plotnikov et al.
2020/0004535 A1 * 1/2020 Yap ......................... G06F 9/345
2020/0097289 A1 * 3/2020 Eapen ................. G06F 9/30036
2023/0409322 A1 * 12/2023 Pennycook ........... G06F 9/3887

OTHER PUBLICATIONS

Invitation to Pay Additional Fees and, Where Applicable, Protest Fee, App. No. PCT/EP2024/025139, Mailed Jul. 17, 2024, 9 pages.
Notification of Transmittal of the International Search Report and the Written Opinion of the International Searching Authority, or the Declaration, App. No. PCT/EP2024/025139, Mailed Sep. 10, 2024, 17 pages.
Office Action, App. No. 18/509,121, Mailed Jun. 27, 2025, 17 pages.
Response to Office Action, App. No. 18/509,121, filed Sep. 29, 2025, 18 pages.

(Continued)

*Primary Examiner* — Michael J Metzger
(74) *Attorney, Agent, or Firm* — Berkeley Law & Technology Group, LLP

(57) ABSTRACT

The present disclosure relates generally to integrated circuits and relates more particularly to indexed vector permutation operations.

11 Claims, 11 Drawing Sheets

500

(56) References Cited

OTHER PUBLICATIONS

Final Office Action, App. No. 18/509,121, Mailed Nov. 21, 2025, 22 pages.
Notification Concerning Transmittal of Copy of International Preliminary Report on Patentability, App. No. PCT/EP2024/025139, Mailed Dec. 18, 2025, 10 pages.
RCE Filed, U.S. Appl. No. 18/509,121, Filed Feb. 23, 2026, 22 pages.
Office Action, U.S. Appl. No. 18/509,121, Filed Feb. 23, 2026, 18 pages.

* cited by examiner

600
Z1
Z0
Z0_gt_cnt
Z0_eq_cnt
idx
Zm0
Z1_lt_cnt
Zm1
IDXMOV
Zd

1100

INDEXED VECTOR PERMUTATION OPERATIONS

BACKGROUND

Field

The present disclosure relates generally to integrated circuits and relates more particularly to indexed vector permutation operations.

Information

Integrated circuit devices, such as processors, for example, may be found in a wide range of electronic device types. Computing devices, for example, may include integrated circuit devices, such as processors, to process signals and/or states representative of diverse content types for a variety of purposes. Signal and/or state processing techniques continue to evolve. For example, some integrated circuit devices may include circuitry to implement a vector architecture, including circuitry to perform vector permutation operations.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
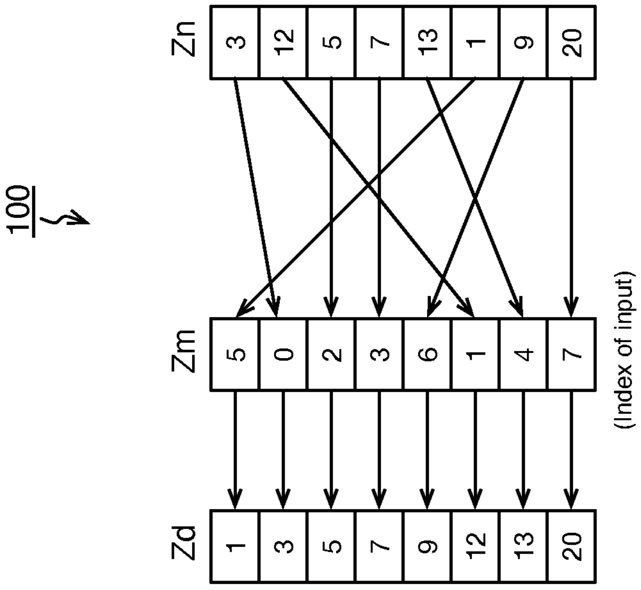
FIG. 1 is a diagram illustrating an example vector permutation operation, in accordance with an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to “claimed subject matter” refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the patent application, particular context of description and/or usage provides helpful guidance regarding reasonable inferences to be drawn; however, likewise, “in this context” in general without further qualification refers to the context of the present patent application.

As mentioned, integrated circuit devices, such as processors, for example, may be found in a wide range of electronic device types. Computing devices, for example, may include integrated circuit devices, such as processors, to process signals and/or states representative of diverse content types for a variety of purposes. Signal and/or state processing techniques continue to evolve. For example, some integrated circuit devices may include circuitry to implement a vector architecture, including circuitry to perform vector permutation operations.

As utilized herein, “permutation” and/or the like refers to particular arrangements of data elements in an array, vector, matrix, etc. For example, [3, 2, 1] and [1, 3, 2] may comprise permutations of vector [1, 2, 3]. A “vector permutation operation” and/or the like refers to affecting particular arrangements of elements of a vector, which may include storing particular elements of one or more vectors, arrays, etc. to particular and/or specified ordered positions within a register. For example, vector permutation operations may include re-arranging a vector of data elements (e.g., values, signals, states, etc.) within a register and/or may include transferring a vector of data elements from one register to another with the data elements having a particular order of some type. In some circumstances, such re-arranging and/or transferring may include a processor and/or other circuitry writing data elements from a register to a storage (e.g., memory) and then storing the data elements to the same register and/or to a different register according to a particular and/or specified order. Vector permutation operations may find utility in any of a wide range of applications, processes, computations, instructions, etc. In some circumstances, vector permutation operations may be utilized to process matrices and/or arrays (e.g., sparse data sets) as part of a neural network implementation and/or as part of any of a wide range of other applications, for example. Of course, subject matter is not limited in scope in these respects.

In some circumstances, vector permutation operations may include memory scatter and/or memory gather operations, wherein data elements may be read from a first register, written to memory, and then stored to a second register in a particular and/or specified order, for example. One particular disadvantage to vector permutation operations including memory scatter and/or memory gather operations, for example, is the overhead involved in accessing memory to perform the scatter and/or gather operations. As explained more fully below, improved efficiency, performance, etc., may be achieved via embodiments wherein vector permutation operations and/or the like may be performed without accesses to and/or from memory.

FIG. 1 is a diagram illustrating an example vector permutation operation 100. In some circumstances, a vector permutation operation such as example vector permutation operation 100 depicted in FIG. 1 may comprise a vector table (TBL) instruction and/or an extended vector table (TBX) instruction for a Scalable Vector Extension (SVE) instruction set architecture from ARM Limited, for example, and/or may comprise a vector permutation (VPERM) instruction and/or the like for an x86 instruction set architecture from Intel, Corp., for example. These example instructions may include taking at least one vector of values (e.g., input vector Zn depicted in FIG. 1) stored at ordered positions of at least a first register and selecting values at particular ordered positions of the first register to write to particular ordered positions of a second register (e.g., output vector Zd). For these example instructions, an index vector (e.g., index vector Zm), stored in a third register, for example, may specify which values from particular ordered positions of the input vector are to be stored in particular ordered positions of the output vector, as demonstrated below.

For example vector permutation operation 100, input vector Zn may comprise a plurality of values stored at ordered positions of a first register. For example vector permutation operation 100, input vector Zn may comprise values [3, 12, 5, 7, 13, 1, 9, 20] ordered from a $0^{th}$ position to a $7^{th}$ position, wherein a value of "3" is stored at a $0^{th}$ position of vector Zn, a value of "12" is stored at a $1^{st}$ position of Zn, a value of "5" is stored at a $2^{nd}$ position of Zn, etc. For example vector permutation operation 100, the values of Zn are to be re-arranged and stored as an output vector Zd in a second register, wherein the re-arrangement is determined by the values of index vector Zm stored in a third register. For example vector permutation operation 100, individual values of index vector Zm may specify a particular position of input vector Zn for a corresponding position of output vector Zd. That is, for example, the value "5" stored at the $0^{th}$ position of index vector Zm indicates that the value stored at the $5^{th}$ position of input vector Zn is to be stored at the $0^{th}$ position of output vector Zd (e.g., value "1" from the $5^{th}$ position of input vector Zn is stored at the $0^{th}$ position of output vector Zd as specified by the value at the $0^{th}$ position of index vector Zm). Also, for example, the value "6" stored at the $4^{th}$ position of index vector Zm indicates that the value stored at the $6^{th}$ position of input vector Zn is to be stored at the $4^{th}$ position of output vector Zd (e.g., value "9" from $6^{th}$ position of input vector Zn is stored at the $4^{th}$ position of output vector Zd as specified by the value at the $4^{th}$ position of index vector Zm), and so on. Example vector permutation operation 100 may be looked at as a gather of values from one or more input vectors to generate an output vector, which may be analogous in at least some respects to a memory gather operation.

One potential drawback of example vector permutation operation 100, discussed above, is that some algorithms for some instruction set architectures may produce output-based indices that cannot use input-based permute instructions, such as the TBL, TBX and/or VPERM instructions mentioned above, for example. To address these issues, a different type of indexed vector permutation operation is proposed, as discussed more fully below.

Figure 2:
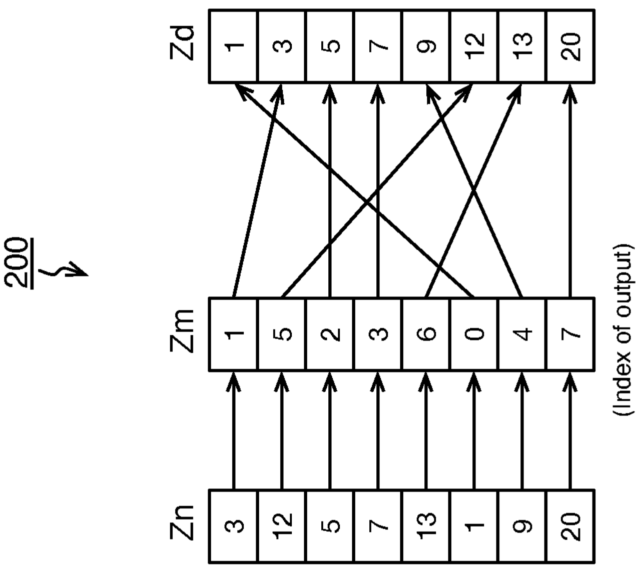
FIG. 2 is a diagram illustrating an example indexed vector permutation operation, in accordance with an embodiment.

FIG. 2 is a diagram illustrating an embodiment 200 of an example indexed vector permutation operation and/or instruction (e.g., IDXMOV operation and/or instructions). In implementations, example 200 may comprise a method of indexed vector permutation operations. Although example vector permutation operation 100 and example IDXMOV operation 200 appear to have some similar characteristics, they may differ in important ways. For example, as described above, example vector permutation operation 100 may utilize an index vector Zm whose values describe positions within an input vector Zn. In contrast, example IDXMOV operation 200 utilizes an index vector Zm whose values describe positions of an output vector Zd. Further, just as example vector permutation operation 100 may be thought of as being analogous in some respects to a memory gather operation, example IDXMOV operation 200 may be thought of as analogous in some respects to a memory scatter operation (although IDXMOV operation 200 may not involve memory accesses, in implementations). Stated otherwise, example vector permutation operation 100 may involve performance of a gather of some input vector(s) of data to an output vector register, whereas example IDXMOV operation 200 involves performance of a scatter of input data to the output vector register, for example.

Example IDXMOV operation 200 is shown in FIG. 2 as comprising an input vector Zn, an output vector Zd and an index vector Zm. In implementations, input vector Zn may be stored at a first register, output vector Zd may be stored at a second register and index vector Zm may be stored at a third register. Of course, subject matter is not limited in scope to these particular details regarding hardware storage of the various data structures (e.g., vectors Zn, Zm and Zd). For the particular example depicted in FIG. 2, input vector Zn may comprise ordered values [3, 12, 5, 7, 13, 1, 9, 20] stored at a first register. Also, for the particular example depicted in FIG. 2, output vector Zd may comprise a set of ordered values [1, 3, 5, 7, 9, 12, 13, 20] stored at a second register as a result of example IDXMOV operation 200. Further, index vector Zm may comprise ordered values [1, 5, 2, 3, 6, 0, 4, 7] stored at a third register.

For example IDXMOV operation 200, the values of Zn are to be re-arranged and stored as an output vector Zd in a second register, wherein the re-arrangement is determined at least in part by the values of index vector Zm stored in a third register. For example IDXMOV operation 200, individual values of index vector Zm may specify a particular position of output vector Zd for a corresponding position of input vector Zn. That is, for example, the value "1" stored at the $0^{th}$ position of index vector Zm indicates that the value stored at the $0^{th}$ position of input vector Zn is to be stored at the $1^{st}$ position of output vector Zd (e.g., value "3" from the $0^{th}$ position of input vector Zn is stored at the $1^{st}$ position of output vector Zd as specified by the value at the $0^{th}$ position of index vector Zm). Also, for example, the value "6" stored at the $4^{th}$ position of index vector Zm indicates that the value stored at the $4^{th}$ position of input vector Zn is to be stored at the $6^{th}$ position of output vector Zd (e.g., value "13" from $4^{th}$ position of input vector Zn is stored at the $6^{th}$ position of output vector Zd as specified by the value at the $4^{th}$ position of index vector Zm), and so on. As mentioned, example IDXMOV operation 200 may be thought of as analogous in some respects to a memory scatter operation. That is, IDXMOV operation 200 may involve performance of a scatter of input data to an output vector register, for example.

As mentioned, example IDXMOV operation 200 may be directed to helping to alleviate at least some of the potential drawbacks of example vector permutation operation 100. For example, as mentioned, some vector permutation operations, such as example vector permutation operation 100, may result in increased overhead, decreased efficiency and/or decreased performance for some instruction set architectures as compared with other instruction set architectures. In some circumstances, scatter-store operations may be utilized to place input data into indexed positions, for example. However, scatter-store operations may be relatively difficult to implement efficiently, perhaps resulting in single-word micro-operations for particular processor core types. Also, for example, such scatter-store operations may fail to take advantage of locality of indices due to the considerable logic and/or other circuitry that may be required to merge micro-operations. Further, processor implementations may not dedicate integrated circuit die area for such operations. However, embodiments described herein, such as example IDXMOV operation 200, may allow software applications and/or hardware implementations to specify such "scatter" operations more efficiently in circumstances where multiple indices fall within a vector of output, for example.

Figure 3:
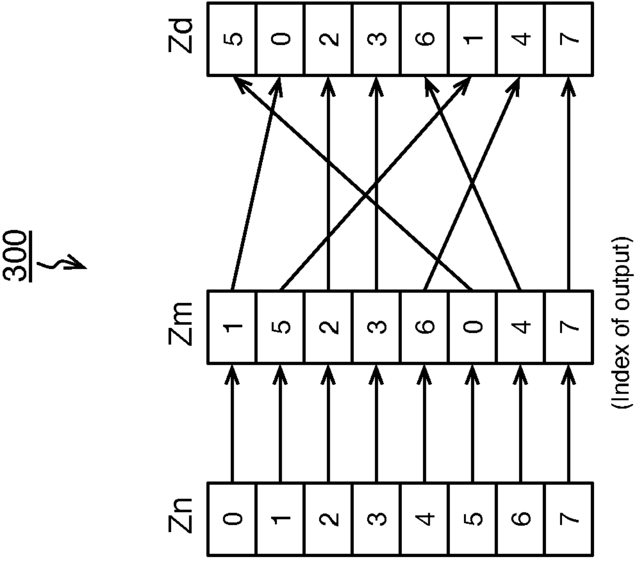
FIG. 3 is a diagram illustrating a particular example indexed vector permutation operation, in accordance with an embodiment.
Figure 3:

FIG. 3 is a diagram illustrating a particular example IDXMOV operation 300. Example IDXMOV operation 300 is provided in part to demonstrate that one may not efficiently utilize permute instructions that rely on input-oriented indices, such as the TBL, TBX and/or VPERM, for example, for algorithms that produce output-oriented indices. For some architectures, such as those that may be implemented in some processor core designs by ARM Limited, for example, it may be advantageous and/or necessary to first perform an IDXMOV operation 200 on an input vector Zn to generate an index vector Zm for example vector permutation operation 100. That is, for some instruction set architectures, to perform an in-register gather-type vector permutation operation, such as example vector permutation operation 100, it may first be necessary to generate an index vector Zm by performing a scatter-type operation, such as IDXMOV operation 200, on an input vector Zn, for example. Note that output vector Zd of FIG. 3 is identical to index vector Zm of FIG. 1. Thus, for at least some instruction set architectures, increased efficiency and/or performance may be achieved via implementation of an indexed vector permutation operation and/or instruction, such as example IDXMOV operation 200.

Figure 4:
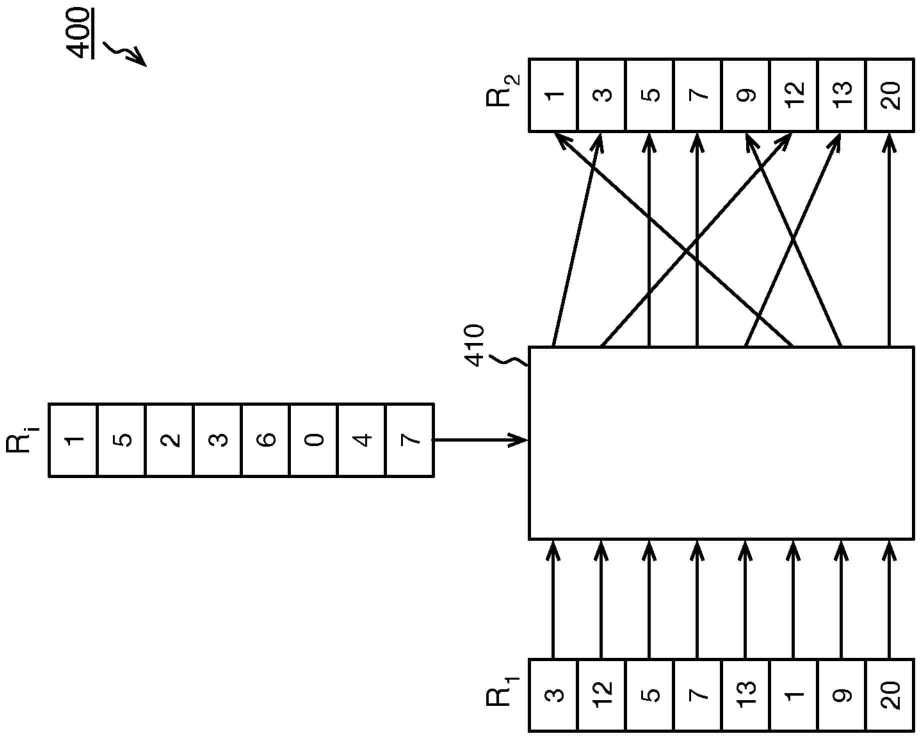
FIG. 4 is a schematic block diagram depicting circuitry to perform an indexed vector permutation operation, in accordance with an embodiment.

FIG. 4 is a schematic block diagram depicting an embodiment 400 of circuitry to perform an indexed vector permutation operation, such as example IDXMOV operation 200. In implementations, a first register $R_1$ may store an input vector, such as input vector Zn, a second register $R_2$ may store an output vector Zd of values comprising results of IDXMOV operation 200. Also, in implementations, a third register $R_i$ may store an index vector Zm. Note that the values of vectors Zm, Zn and Zd for the example depicted in FIG. 4 are identical to the values of vectors Zm, Zn and Zd for the example depicted in FIG. 2. In implementations, registers $R_1$, $R_2$ and/or $R_i$ may comprise eight elements of sixty-four bits each. Of course, subject matter is not limited in scope in these respects. In some implementations, the indices indicated by the elements of input vector Zn and/or output vector Zd depicted in FIG. 2 and/or FIG. 4 may be associated with respective payloads, for example.

In an implementation, circuitry 410 may perform IDXMOV operation 200, for example. In some implementations, circuitry 410 may comprise a processing device (e.g., one or more processor cores). In other implementations, circuitry 410 may comprise specialized hardware (e.g., bespoke integrated circuit) designed specifically for performing IDXMOV operations. For example, circuitry 410 may comprise transistor logic circuits, encoders, decoders, multiplexors, etc. In some implementations, circuitry 410 may be clocked by a periodic signal (e.g., clock signal). Further, for example, IDXMOV operation 200, when executed by a processing device, may be generate a result within a single clock cycle, although again, subject matter is not limited in scope in these respects.

In implementations, index vector Zm may be programmable. For example, an index field of an IDXMOV instruction may allow a software application developer to specify an index vector, as described more fully below. In other implementations, an index vector may be hardcoded (e.g., fixed values expressed as part of an integrated circuit implementation) and/or may be generated at least in part via combinatorial logic and/or other circuitry of an integrated circuit device, for example.

Figure 5:
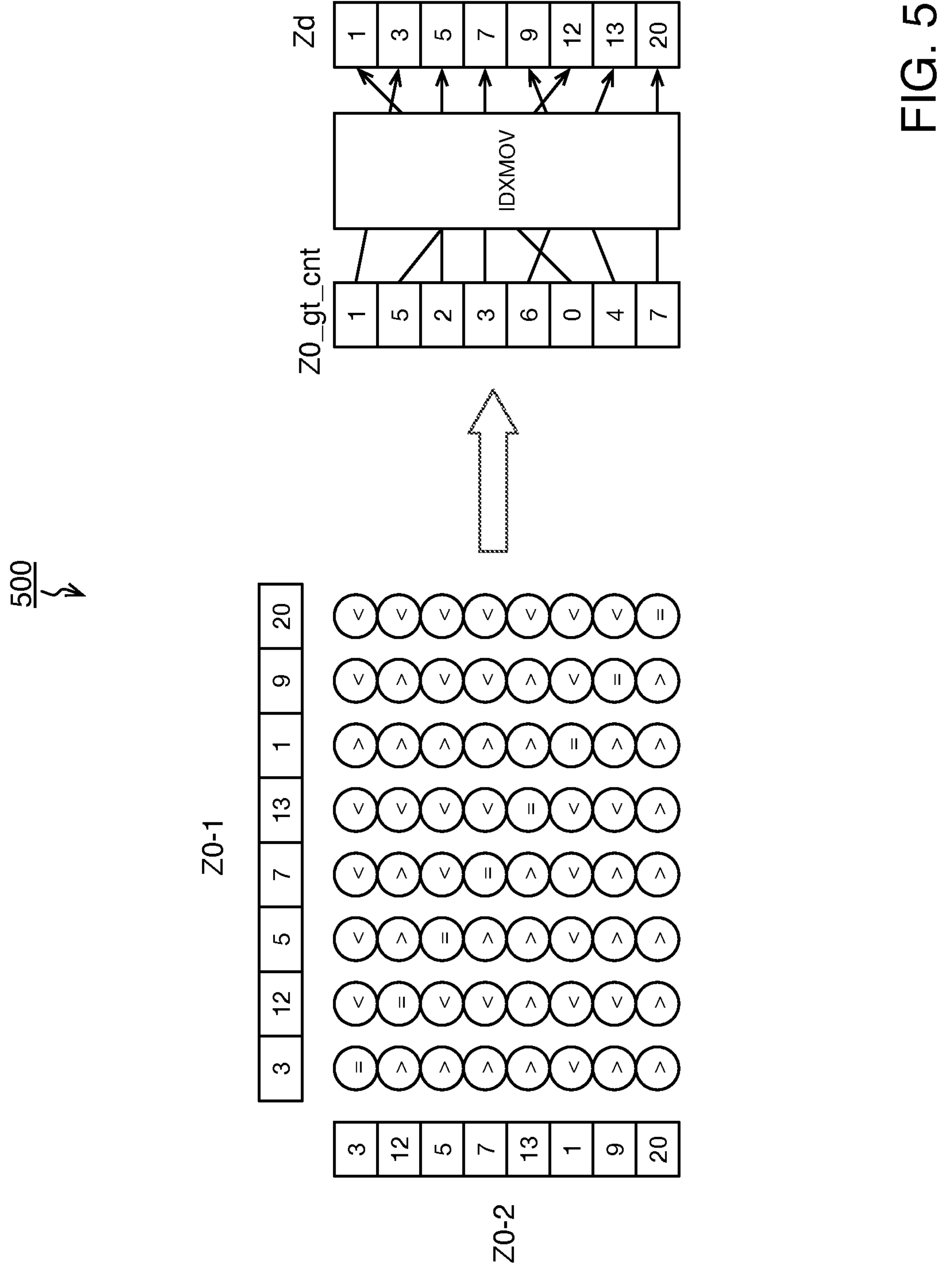
FIG. 5 is an illustration depicting an example single vector sort operation, including circuitry to perform an indexed move operation, in accordance with an embodiment.

FIG. 5 is an illustration depicting an example single vector sort operation 500, including circuitry to perform an example IDXMOV operation, such as example IDXMOV operation 200, for example. For the particular example depicted in FIG. 5, single vector sort operation 500 may sort eight sixty-four bit elements in three instructions, including a two-dimensional compare instruction (CMP2D), an instruction to populate an index register with results of the two-dimensional compare instruction, and an IDXMOV instruction, such as discussed previously. For the example single vector sort operation depicted in FIG. 5, the IDXMOV operation, in accordance with embodiments and/or implementations described herein, may replace what would otherwise be eight store micro-operations. By replacing the eight store micro-operations, implementation of an IDXMOV instruction may result in increased performance and/or efficiency over circumstances where an IDXMOV instruction is not implemented.

As mentioned, example single vector sort operation 500 may include a two-dimensional compare instruction (CMP2D), an instruction to populate an index register with results of the two-dimensional compare instruction, and an IDXMOV instruction. For the two-dimensional compare operation, an input vector $Z_0$ may provide both operands of the two-dimensional compare (e.g., identical input operand vectors Z0-1 and Z0-2). FIG. 5 depicts the intermediate results of individual comparisons between individual elements of a first instance of input vector $Z_0$ (e.g., vector Z0-1) and a second instance of input vector $Z_0$ (e.g., vector Z0-2). For example, the $0^{th}$ row of the comparison result set shows results of comparisons between the $0^{th}$ element of the second instance of input vector $Z_0$ (e.g., vector Z0-2) and individual elements of the first instance of input vector $Z_0$ (e.g., vector Z0-1). It may be noted that these comparisons yield a single instance wherein the $0^{th}$ element of vector Z0-2 is greater than the individual elements of vector Z0-1. Further, for example, the $1^{st}$ row of the comparison result set shows five instances wherein the $1^{st}$ element of vector Z0-2 is greater than the individual elements of vector Z0-1, the $2^{nd}$ row of the comparison result set shows two instances wherein the $2^{nd}$ element of vector Z0-2 is greater than the individual elements of vector Z0-1, and so forth and so on.

In implementations, single vector sort operation 500 may include an instruction to populate an index register with results of the two-dimensional compare instruction, as mentioned above. For example, FIG. 5 depicts an index vector "Z0_gt_cnt" comprising values specifying a number of instances wherein a particular element of vector Z0-2 has a value that is greater than the individual elements of vector Z0-1 for a particular row of the result set. For the example depicted in FIG. 5, index vector Z0_gt_cnt may comprise values of [1, 5, 2, 3, 6, 0, 4, 7]. Of course, claimed subject matter is not limited in scope in these respects. In implementations, index vector Z0_gt_cnt may be stored in a register (e.g., index register) and/or in any other suitable storage structure.

Responsive at least in part to the population of the index register, an IDXMOV instruction may be performed wherein elements from input vector $Z_0$ may be scattered, in accordance with index vector Z0_gt_cnt, to an output vector Zd to produce a sorted permutation of input vector $Z_0$. In implementations, output vector Zd may be stored in an output register, thereby completing execution of the example single vector sort instruction of FIG. 5.

As mentioned, utilizing an IDXMOV instruction in this fashion may allow for the sorting of a single vector in three instructions (e.g., a CMP2D instruction, an instruction to load comparison results into an index vector register, and an IDXMOV instruction). Without an IDXMOV instruction, it would be necessary to perform a scatter operation to contiguous locations, and then to load into a register if re-use of the sorted vector is desired. Further, for circumstances wherein a payload is associated with the indices, values, etc. of an input vector, an additional scatter-store operation (e.g., eight micro-operations) for the payload may be replaced by an IDXMOV instruction, further demonstrating the advantage of increased performance and/or efficiency that may be realized via an IDXMOV instruction.

Figure 6:
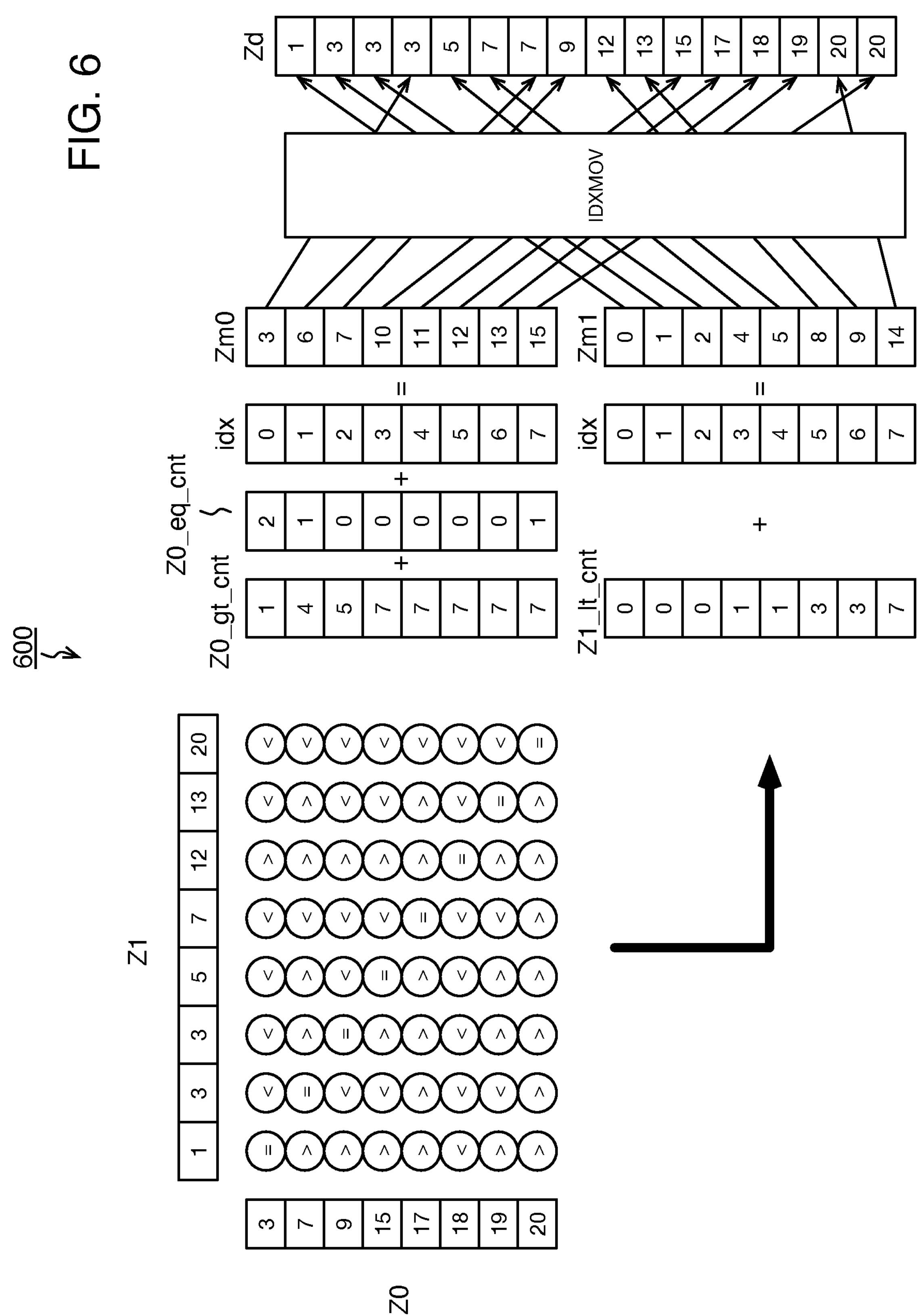
FIG. 6 is a diagram showing an example merge-sort operation, in accordance with an embodiment.

FIG. 6 is a diagram illustrating an embodiment 600 of an example merge-sort operation. For example merge-sort operation 600, a pair of input vectors Z0 and Z1 (e.g., previously individually sorted) may undergo a two-dimensional compare (CMP2D) operation, wherein individual elements of input vector Z0 are compared with individual elements of input vector Z1, thereby yielding an intermediate result set as depicted in FIG. 6. It may be noted that the comparisons between the individual elements of the two input vectors depicted in FIG. 6 may be similar in at least some respects to the comparisons discussed above in connection with FIG. 5. However, for example merge-sort operation 600, several index vectors may be generated rather than the single index vector generated as part of single vector sort operation 500. For example, index vectors indicating the number of instances of a value of input vector Z0 being greater than, equal to, and/or less than a corresponding value of input vector Z1 for individual rows of the results set may be generated.

In an implementation, an index vector indicating the number of instances of a value of input vector Z0 being greater than a corresponding value of input vector Z1 for individual rows of the results set may be labeled "Z0_gt_cnt," an index vector indicating the number of instances of a value of input vector Z0 being equal to a corresponding value of input vector Z1 for individual rows of the results set may be labeled "Z0_eq_cnt," and an index vector indicating the number of instances of a value of input vector Z1 being less than a corresponding value of input vector Z0 for individual rows of the results set may be labeled "Z1_It_cnt."

In implementations, respective values from index vectors Z0_gt_cnt and Z0_eq_cnt may be added to respective values from a register IDX (e.g., values 0, 1, 2, . . . , 7) to generate values for a first index vector Zm0. Additionally, values from index vector Z1_It_cnt may be added to respective values of register IDX to generate values for a second index vector Zm1, as depicted in FIG. 6.

Also, in implementations, to continue example merge-sort operation 600, values from input vector Z0 may be sorted into output vector Zd via a pair of IDXMOV operations in accordance with the values of index vector Zm0. In implementations, output vector Zd may comprise two vectors, wherein the two vectors individually are similar in length to vectors Z0 and Z1. That is, for example, output vector Zd may have a length that is twice that of vectors Z0 and/or Z1, in some implementations. Additionally, for example, values from input vector Z1 may be sorted into output vector Zd via another pair of IDXMOV operations in accordance with the values of index vector Zm1. Output vector Zd may comprise the results of a merge-sort operation performed on input vectors Z0 and Z1. In implementations, output vector Zd may be stored in a register to enable re-use of the output vector in subsequent data processing operations, for example.

Generally, a merge-sort operation similar to merge-sort operation 600 may be implemented without the help of IDXMOV operations. For example, the four IDXMOV operations mentioned above in connection with example merge-sort operation 600 may be replaced with two scatter store operations that would result in sixteen micro-operations for a 512-bit scalable matrix extension (SME) and/or for streaming scalable vector extension (SVE) having 64-bit keys. By replacing the scatter store operations with IDXMOV operations, the number of operations required to perform a merge-sort operation may be significantly reduced. Also, for example, a payload would also require sixteen micro-operations which would be replaced by an additional four IDXMOV operations, in implementations. Further, for 32-bit data sizes, scatter operations may double to thirty-two micro-operations each for indices (e.g., values of input vectors) and payload. In implementations, these micro-operations may be replaced by one or more IDXMOV operations (e.g., four IDXMOV operations), again increasing performance and efficiency, for example.

Figure 7:
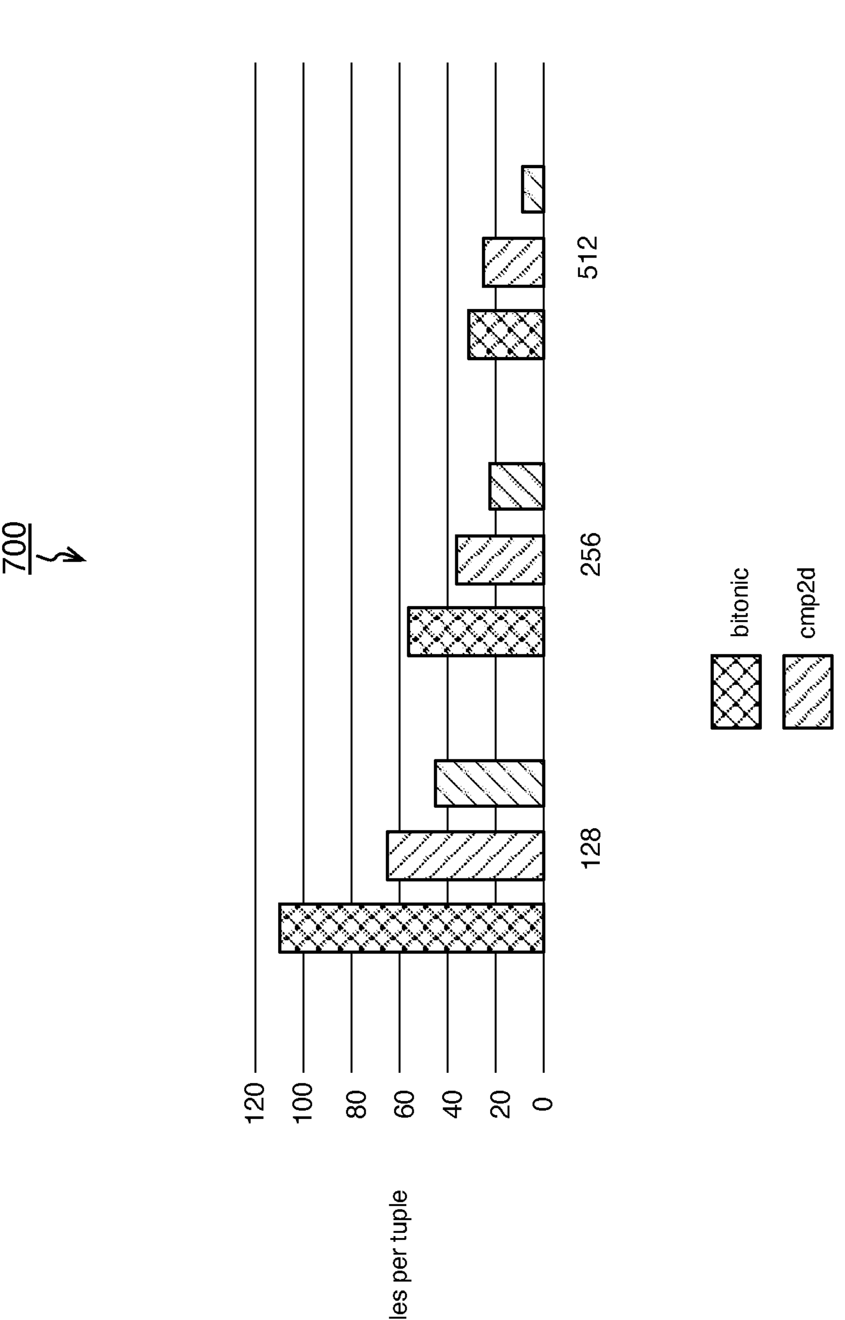
FIG. 7 is a graph depicting example estimated performance measurements for a plurality of merge-sort implementations, in accordance with an embodiment.

FIG. 7 is a graph 700 depicting example estimated performance measurements for a plurality of merge-sort implementations. Graph 700 depicts estimated performance for CMP2D+IDXMOV type merge-sort operations against CMP2D-type (e.g., without IDXMOV) merge-sort operations and against bitonic merge-sort operations. To achieve the estimated results of graph 700, 50,000 elements that were second-level cache (L2) resident were sorted using bitonic-type merge-sort operations, CMP2D-type merge-sort operations and CMP2D+IDXMOV type merge-sort operations.

As may be seen in graph 700 of FIG. 7, the estimated results show that CMP2D+IDXMOV merge-sort provides a relatively very large benefit over bitonic merge-sort and/or over CMP2D merge-sort. Estimated results are provided for implementations having a vector length of 128, implementations having a vector length of 256 and implementations having a vector length of 512, as shown in graph 700 of FIG. 7.

Table 1, below, shows relative speedups of CMP2D merge-sort and CMP2D+IDXMOV merge-sort over bitonic merge-sort:

TABLE 1

| Vector Length | CMP2D | CMP2D + IDXMOV |
|---|---|---|
| 128b | 1.66 | 2.3 |
| 256b | 1.48 | 2.56 |
| 512b | 1.18 | 3.08 |

For the estimated results of graph 700 and/or Table 1, the CMP2D-type merge-sort achieves a modest 1.18-1.66× speedup over bitonic merge-sort. Also, it may be noted that this speedup of CMP2D-type merge-sort over bitonic merge-sort does not appear to scale particularly effectively with vector length. This may be due at least in part to scatter micro-operations dominating runtime. This particular challenge may get worse with larger vector lengths.

For CMP2D+IDXMOV merge-sort operations, a significant speedup over bitonic merge-sort may be noted. This may be due at least in part to IDXMOV instruction allowing for in-register merge-sorting, such as discussed above in connection with FIG. 6. Additionally, the estimated results of graph 700 and/or of Table 1 also show that the CMP2D+IDXMOV merge-sort operation may scale better with vector length as compared with bitonic merge-sort. For example, for CMP2D+IDXMOV merge-sort achieved a speedup of up to 3.08× over bitonic merge-sort.

Because the indexed vector permutation operations described herein, such as indexed vector permutation operation 200 (e.g., IDXMOV), allow for in-register merge-sorting, for example, the testing routine for the results of graph 700 and/or of Table 1 included construction of four block of four vectors of sorted data elements before starting to merge blocks. At a 512 bit (16 word) vector length, this allowed for the loading of four vectors (64 tuples) of unsorted data elements and allowed for sorting them completely in-register (i.e., without accessing memory) during testing. This demonstrates an additional improvement unlocked via implementation of an IDXMOV operation such as discussed herein.

Also, in implementations, an in-register four vector sort, such as mentioned above, may also be utilized to accelerate a clean-up phase of a quicksort operation (e.g., once the bucket size reaches four vectors). For example, an experiment was conducted wherein an odd-even cleanup (e.g., similar to bitonic operation) was replaced with a CMP2D+IDXMOV merge-sort such as discussed above and a 1.9× speedup was observed for the quicksort operation overall.

Further, in implementations, indexed vector permutation operations, such as IDXMOV operation 200, may be advantageously utilized in connection with merge-sorting for sparse matrix multiplication implementations. Experimental results show CMP2D+IDXMOV merge-sort for sparse matrix multiplication with a speedup of 1.7-3.7× over implementations without an IDXMOV instruction, for example. Based on experimental results discussed above, one might expect similar performance benefits for other multiple sorting-based problems, including, for example, sparse matrix transposition and/or polar decoding (e.g., such as in ARM Limited's 5G libraries).

Figure 8:
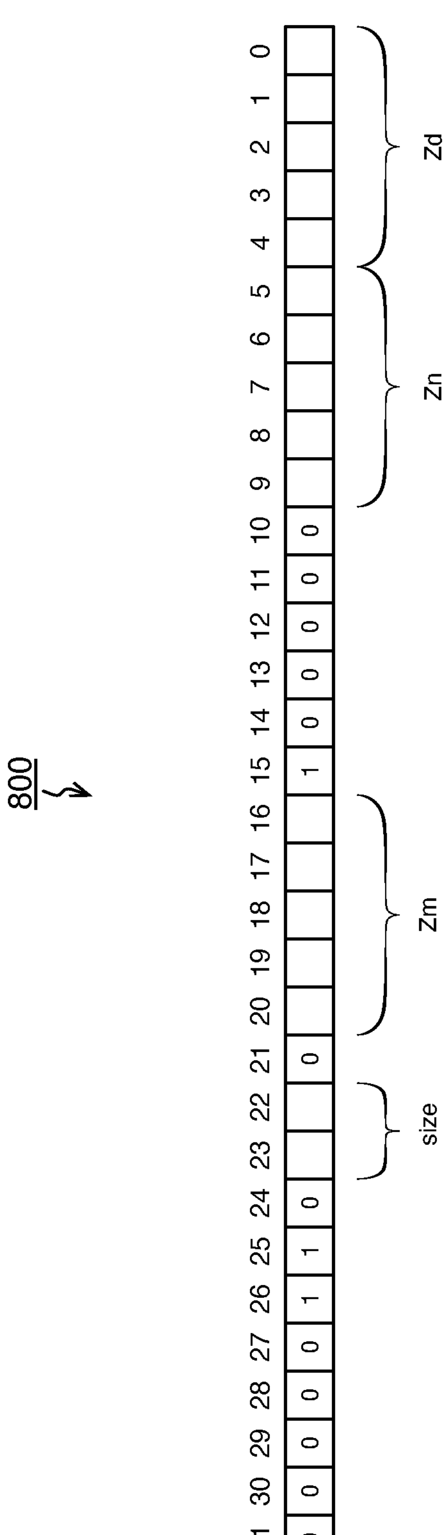
FIG. 8 is an illustration showing an example specification for an indexed move operation, in accordance with an embodiment.

FIG. 8 is an illustration showing an example specification 800 for an indexed vector permutation (e.g., IDXMOV) operation. In an implementation, specification 800 may comprise an example specification for an IDXMOV instruction in ARM Limited's scalable vector extension (SVE). In an implementation, no predicates are utilized. In implementations, data lanes that have indices outside of the specified vector length may be made implicitly inactive, for example.

For example specification 800, value 000001100b from bits 31:24 may specify an IDXMOV instruction. Further, in some implementations, bit 21 and/or bits 15:10 may further specify and/or may further characterize an IDXMOV instruction. A size field SZ at bits 23:22 may indicate any of a plurality of data elements sizes including, for example, eight bit, sixteen bit, thirty-two bit and sixty-four bit data element sizes, for example. In implementations, a two-bit size field may support up to four data element sizes. Further, in an implementation, a field "Zm" at bits 20:16 of specification 800 may store a value indicative of a particular index register (e.g., register having stored therein an index vector). Also, for example, a field "Zn" at bits 9:5 of specification 800 may store a value indicative of a particular input register (e.g., register having stored therein an input vector) and a field "Zd" at bits 4:0 may store a value indicative of a particular output register (e.g., register in which to store a result of the specified IDXMOV instruction). Of course, subject matter is not limited in scope to the particular arrangement of bits, fields, etc. of example specification 800.

As mentioned, specification 800 may specify an IDXMOV operation. In an implementation, an IDXMOV operation may be expressed as pseudo-code, such as the non-limiting example provided below:

```
IDXMOV:
CheckSVEEnabled( ); // ensure scalable vector extension is enabled
constant integer VL = CurrentVL; // VL = vector length
constant integer PL = VL DIV 8;
constant integer elements = VL DIV esize; // number of data elements
bits(VL) operand1 = Z[n, VL]; // specify input register
bits(VL) operand2 = Z[m, VL]; // specify index register
bits(VL) result = Z[d, VL]; // specify output register
for e = 0 to elements-1 // see FIG. 2 and related discussion herein
  integer element2 = UInt(Elem[operand2, e, esize]);
  if element2 < elements then
    Elem[result, element2, esize] = Elem[operand1, e, esize];
Z[d, VL] = result; // results stored in output register
```

As mentioned, example specification 800 of an example IDXMOV instruction may not implement predicates. That is, in implementations, a predicate register may not be needed to implement an IDXMOV operation. This may save encoding space because a predicate register may take three more bits, for example, to specify for ARM SVE. In implementations, lanes that may have their index out of range of a specified vector length may not affect the output, so a programmer may set inactive lanes of a computation by setting the indices appropriately. Note that elements with the same index can conflict. In the pseudo-code provided above, subsequent lanes may override earlier lanes of the same index, for example.

Although embodiments and/or implementations are described herein for indexed vector permutation operations, such as an IDXMOV operation, as having particular configurations, arrangements and/or characteristics, subject matter is not limited in scope in these respects. For example, although it is mentioned above that an IDXMOV instruction may be specified without predicates, other implementations may incorporate predicates. For example, predicates may be utilized within a specification of an IDXMOV operation to disable one or more data lanes at the input so that those data lanes do not affect the output. In such implementations, predicates may be utilized to mask particular data lanes, for example. Also, a single predicate may mask data lanes from two input vectors, in an implementation, because lanes of the two input vectors are mapped 1:1, for example. Again, subject matter is not limited in scope in these respects.

In other implementations, an IDXMOV operation and/or the like may be expanded to have two output vectors. For example, a variation of an indexed vector permutation operation (e.g., IDXMOV2) may permute into two output vectors. In such an implementation, lanes of the second output vector may correspond to indices VL (vector length) through 2*VL from the input index vector, for example.

In still other implementations, an indexed vector permutation operation, such as IDXMOV operation 200, for example, may be further expanded upon wherein an implementation may include four input vectors (e.g., two sets of keys and/or two sets of indices). For example, the four input vectors may be permuted into one or more output vectors. With four input vectors and 2 output vectors, implementations may perform four IDXMOV operations such as discussed above in connection with FIG. 6 in one instruction, for example. In implementations, this may result in four IDXMOV micro-operations in an ARM SVE implementation, partially due to the difficulty of supporting so many input and outputs in a micro-architecture. Of course, subject matter is not limited in scope in these respects.

Figure 9:
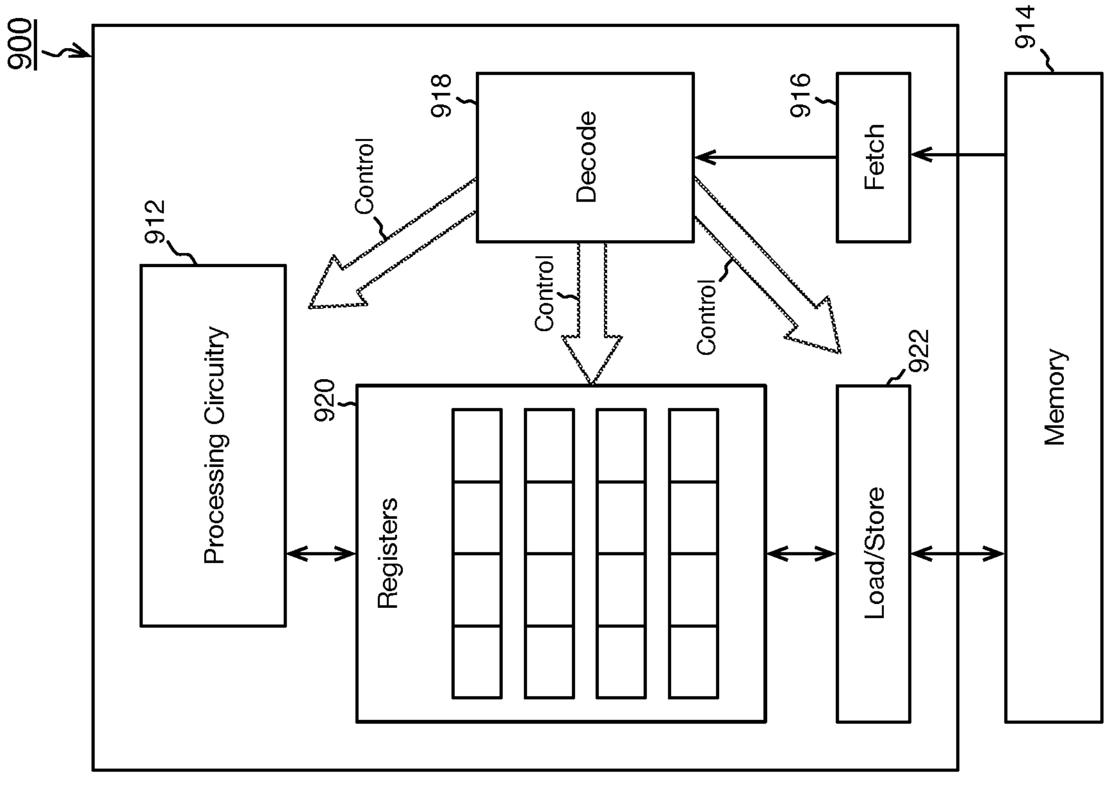
FIG. 9 is a schematic block diagram depicting an example processing device, in accordance with an embodiment.

FIG. 9 is a schematic block diagram depicting an embodiment 900 of an example computing device. In an implementation, computing device 900 may comprise a data processing apparatus which may embody various examples of the present techniques. For example, computing device 900 may perform, in whole or in part, example embodiments described herein. Computing device 900 may comprise processing circuitry 912 which may perform processing operations on signals and/or states (e.g., data items) responsive at least in part to a sequence of instructions which processing circuitry 912 may execute. In implementations, executable instructions may be retrieved from a memory 914 to which processing circuitry 912 may have access and, in a manner with which one of ordinary skill in the art will be familiar, fetch circuitry 916 may be provided for this purpose. Furthermore, executable instructions retrieved by the fetch circuitry 916 may be passed to instruction decode circuitry 918, which may generate control signals configured to control various aspects of the configuration and/or operation of processing circuitry 912, a set of registers 920 and/or a load/store unit 922. Generally, processing circuitry 912 may be arranged in a pipelined fashion, yet the specifics thereof are not relevant to the present techniques. One of ordinary skill in the art will be familiar with the general configuration which FIG. 9 represents and further detailed description thereof is dispensed herewith merely for the purposes of brevity. The registers 920, as can be seen in FIG. 9, may individually comprise storage for multiple data elements, such that processing circuitry 912 can apply data processing operations either to a specified data element within a specified register, or can apply data processing operations to a specified group of data elements (a "vector") within a specified register. In particular the illustrated data processing apparatus is concerned with the performance of vectorized data processing operations, and specifically to the execution of vector instructions with respect to data elements held in the registers 920, the execution of which is dependent on an index vector, as described herein. Data values required by processing circuitry 912 in the execution of the instructions, and data values generated as a result of those data processing instructions, may be written to and/or read from the memory 914 by means of load/store unit 922. Note also that generally memory 914 may be viewed as an example of a non-transitory computer-readable storage medium on which executable instructions for some implementations may be stored, typically as part of a predefined sequence of instructions (a "program"), which the processing circuitry then executes. The processing circuitry may however access such a program from a variety of different sources, such in RAM, in ROM, via a network interface, and so on.

As mentioned, computing device 900 may perform example operations discussed herein. For example, processing circuitry 912 may perform an IDXMOV operation in accordance with a IDXMOV specification decoded at instruction decode circuitry 918 after having been fetched from memory 914 via fetch circuitry 916. Input vectors and/or index vectors for IDXMOV operations, for example, may be stored in one or more of registers 920. Also, for example, one or more of registers 920 may store an output vector.

Figure 10:
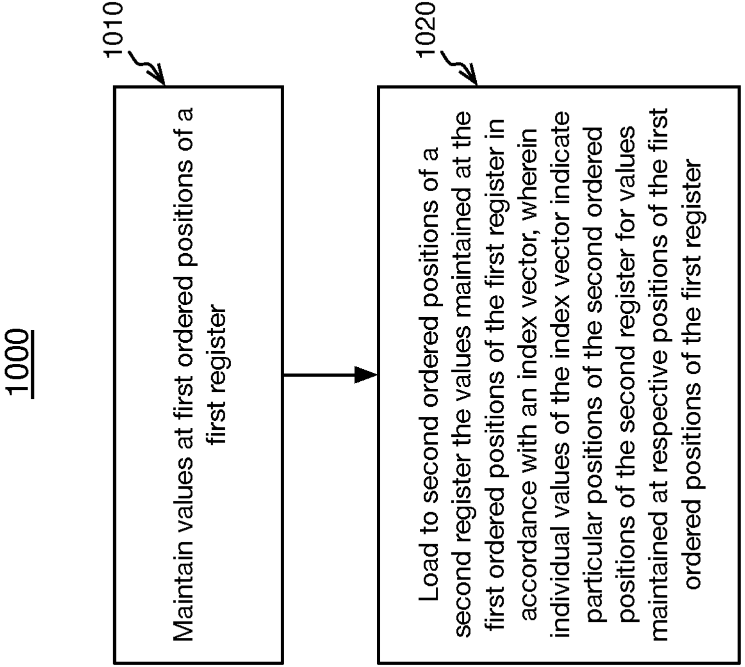
FIG. 10 is a flow diagram depicting an example process for performing an indexed vector permutation operation, in accordance with an embodiment.
Figure 11:
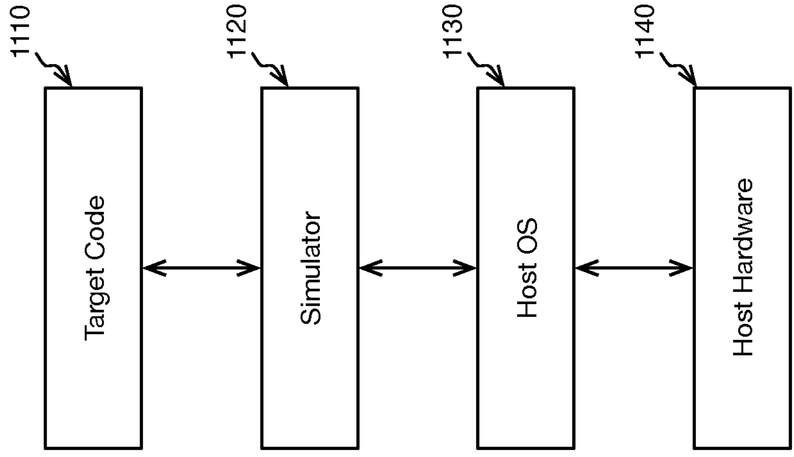
FIG. 11 shows a simulator implementation.

FIG. 10 is a flow diagram depicting an embodiment 1000 of an example process for performing an indexed vector permutation operation (e.g., IDXMOV operation 200). In implementations, example process 1000 may comprise a method of indexed vector permutation operations. In a particular implementation, process 1000 may include operations that may be performed in conjunction with circuitry 400 and/or computing device 900, for example. It should be noted that content acquired or produced, such as, for example, input signals, output signals, operations, results, etc. associated with example process 1000 may be represented via one or more digital signals and/or signal packets. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features.

In an implementation, example process 1000 may include maintaining values at first ordered positions of a first register (e.g., register Zn of FIG. 2 and/or register $R_1$ of FIG. 4), as indicated at block 1010. Also, in an implementation, example process may include loading to second ordered positions of a second register (e.g., register Zd of FIG. 2 and/or register $R_2$ of FIG. 4) the values maintained at the first ordered positions of the first register in accordance with an index vector (e.g., values stored in register Zm of FIG. 2 and/or register $R_i$ of FIG. 4). Further, in an implementation, individual values of the index vector may indicate particular positions of the second ordered positions of the second register for values maintained at respective positions of the first ordered positions of the first register. That is, for example, values of an index vector may indicate particular positions of a destination register to which particular values of an input vector may be written. For example, returning to the discussion related to FIG. 2, the $0^{th}$ element of index vector Zm comprises a value of "1." The value of "1" at the $0^{th}$ position of the index vector indicates that a value stored at the $0^{th}$ position of input vector Zn is to be written to the $1^{st}$ position of a destination vector Zd, for example, as can be seen in the example depicted in FIG. 2.

In implementations, example process 1000 may also include maintaining values at first ordered positions of a first register, and may also comprise loading to second ordered positions of a second register the values maintained at the first ordered positions of the first register in accordance with an index vector, wherein individual values of the index vector indicate particular positions of the second ordered positions of the second register for values maintained at respective positions of the first ordered positions of the first register. Also, for example, process 1000 may further include programming a third register to store the index vector.

In implementations, loading to the second ordered positions of the second register the values maintained at the first ordered positions of the first register in accordance with the index vector may include loading to the second ordered positions of the second register the values maintained at the first ordered positions of the first register in accordance with the individual values of the index vector stored in the third register. Further, for example, a processing device may include the first register, the second register and the third register, and loading to the second ordered positions of the second register the values maintained at the first ordered positions of the first register in accordance with the index vector is performed via the processing device. Also, in implementations, loading to the second ordered positions of the second register the values maintained at the first ordered positions of the first register in accordance with the index vector may be performed within a single clock cycle of the processing device. Additionally, the loading to the second ordered positions of the second register the values maintained at the first ordered positions of the first register in accordance with the index vector within the single clock cycle may comprise an indexed move (IDXMOV) operation.

In implementations, process 1000 may further comprise performing a single vector sorting operation, including: performing a two-dimensional compare operation for an input vector, storing results of the two-dimensional compare operation in the first ordered positions of the first register, and performing the IDXMOV operation, wherein values of the second ordered positions of the second register comprise results of the single vector sorting operation, wherein the single vector sorting operation is performed without storing to or gathering from random access memory. In implementations, process 1000 may also include performing a two vector sorting operation, including performing a two-dimensional compare operation for a first input vector and a second input vector, storing results of the two-dimensional compare operation in the first ordered positions of the first register and in third ordered positions of a third register, and performing four IDXMOV operations, wherein values of the second ordered positions of the second register comprise results of the two vector sorting operation, wherein the two vector sorting operation is performed without storing to or gathering from random access memory.

In implementations, an IDXMOV operation may be performed at least in part in accordance with a particular specification of a particular instruction set architecture, wherein the particular specification includes a field indicating the IDXMOV operation, a field indicating a location of the first register, a field indicating a location of the second register, and a field indicating a location of the third register. In implementations, the particular specification of the particular instruction set architecture does not include a predicate field. Further, for example process 1000, the individual values of the index vector are computed at least in part via particular combinatorial logic circuitry.

In an alternative embodiment, FIG. 7 illustrates a simulator implementation of the present technology. Whilst the earlier described embodiments implement the present technology in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software-based implementation of a hardware architecture. Varieties of simulator computer programs include emulators, virtual machines, models, and binary translators, including dynamic binary translators. Typically, a simulator implementation may run on a host hardware (e.g., host processor) 1140, optionally running a host operating system 1130, supporting the simulator program 1120. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on host hardware 1140 (e.g., host processor), some simulated embodiments may make use of the host hardware, where suitable.

The simulator program 1120 may be stored on a computer-readable storage medium (which may be a non-transitory storage medium), and provides a program interface (instruction execution environment) to target code 1110 which is the same as the application program interface of the hardware architecture being modelled by the simulator program 1120. Thus, the program instructions of the target code 1110, such as example operations 200, 500, 600, 800 and/or 1000 described above, may be executed from within the instruction execution environment using the simulator program 1120, so that a host hardware 1140 which does not actually have the hardware features of the apparatus discussed above can emulate these features.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high-speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

The examples and conditional language recited herein are intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its scope as defined by the appended claims.

Furthermore, as an aid to understanding, the above description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to limit the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

It will be clear to one skilled in the art that many improvements and modifications can be made to the foregoing exemplary embodiments without departing from the scope of the present techniques.

What is claimed is:

1. An article, comprising: a non-transitory computer readable medium having stored thereon instructions, including an indexed vector permutation operation, executable by a processing device including a first register, a second register, a third register, and an instruction decoder to decode the indexed vector permutation operation in accordance with a first instruction set architecture, wherein the indexed vector permutation operation comprises an indexed move (IDXMOV) operation, to provide an instruction execution environment and to:

maintain values at first ordered positions of the first register;

program the third register to store an index vector; and at least in part under control of the instruction decoder as part of the IDXMOV operation, load to second ordered positions of the second register the values maintained at the first ordered positions of the first register in accordance with the index vector, utilized by the IDXMOV operation, within a single processing cycle of the processing device, wherein individual values of the index vector stored in the third register indicate which of the second ordered positions of the second register are to receive particular values retrieved from the first ordered positions of the first register.

2. An integrated circuit, comprising:

a processor including:

an instruction decoder to decode an indexed vector permutation operation in accordance with a first instruction set architecture, wherein the indexed vector permutation operation comprises an IDXMOV operation;

a first register to maintain values at first ordered positions of the first register;

a second register to receive values at second ordered positions of the second register;

circuitry to load an index vector to a third register of the processor; and wherein the processor is configured to perform data processing in response to instructions, including the IDXMOV operation, decoded by the instruction decoder;

wherein the instruction decoder is configured to control, at least in part, the register-to-register transfer circuitry to load the values maintained in the first ordered positions to the second ordered positions in accordance with the index vector within a single processing cycle of the processor; and wherein the IDXMOV operation is to be performed at least in part under control of the instruction decoder and at least in part in accordance with a specification of the first instruction set architecture, wherein the specification includes a field indicating the IDXMOV operation, a field indicating a location of the first register, a field indicating a location of the second register, and a field indicating a location of the third register.

3. The integrated circuit of claim 2, wherein, to perform a single vector sorting operation, the processor, at least in part under control of the instruction decoder, is to:

perform a two-dimensional compare operation for an input vector;

store results of the two-dimensional compare operation in the first ordered positions of the first register; and perform the IDXMOV operation, wherein values of the second ordered positions of the second register comprise results of the single vector sorting operation.

4. The integrated circuit of claim 2, wherein, to perform a two vector sorting operation, the processor, at least in part under control of the instruction decoder, is to:

perform a two-dimensional compare operation for a first input vector and a second input vector;

store results of the two-dimensional compare operation in the first ordered positions of the first register and in third ordered positions of the third register; and perform four IDXMOV operations, wherein values of the second ordered positions of the second register comprise results of the two vector sorting operation.

5. The integrated circuit of claim 2, wherein the individual values of the index vector are computed at least in part via particular combinatorial logic circuitry of the integrated circuit.

6. A method comprising:

at a processor including a first register, a second register, a third register, and an instruction decoder, decoding an indexed vector permutation operation in accordance with a first instruction set architecture, wherein the indexed vector permutation operation comprises an indexed move (IDXMOV) operation;

maintaining values at first ordered positions of the first register;

programming the third register to store an index vector; and at least in part under control of the instruction decoder as part of the IDXMOV operation, and at least in part via register-to-register transfer circuitry of the processor, loading the values maintained at the first ordered positions of the first register to second ordered positions of a second register in accordance with the index vector, utilized by the IDXMOV operation, within a single processing cycle of the processor, wherein individual values of the index vector stored in the third register indicate which of the second ordered positions of the second register are to receive particular values retrieved from the first ordered positions of the first register.

7. The method of claim 6, further comprising performing a single vector sorting operation, including:

performing a two-dimensional compare operation for an input vector;

storing results of the two-dimensional compare operation in the first ordered positions of the first register; and performing the IDXMOV operation, wherein values of the second ordered positions of the second register comprise results of the single vector sorting operation;

wherein the single vector sorting operation is performed without storing to or gathering from random access memory.

8. The method of claim 6, further comprising performing a two vector sorting operation, including:

performing a two-dimensional compare operation for a first input vector and a second input vector;

storing results of the two-dimensional compare operation in the first ordered positions of the first register and in third ordered positions of the third register; and performing four IDXMOV operations, wherein values of the second ordered positions of the second register comprise results of the two vector sorting operation;

wherein the two vector sorting operation is performed without storing to or gathering from random access memory.

9. The method of claim 6, wherein the IDXMOV operation is performed at least in part in accordance with a first specification of the first instruction set architecture, wherein the first specification includes a field indicating the IDXMOV operation, a field indicating a location of the first register, a field indicating a location of the second register, and a field indicating a location of the third register.

10. The method of claim 9, wherein the first specification of the first instruction set architecture does not include a predicate field.

11. The method of claim 6, wherein the individual values of the index vector are computed at least in part via particular combinatorial logic circuitry.

* * * * *